United States Patent
Garnier et al.

(10) Patent No.: US 8,940,391 B2
(45) Date of Patent: Jan. 27, 2015

(54) SILICON CARBIDE FIBERS AND ARTICLES INCLUDING SAME

(75) Inventors: John E. Garnier, Idaho Falls, ID (US); George W. Griffith, Idaho Falls, ID (US)

(73) Assignee: Advanced Ceramic Fibers, LLC, Idaho Falls, ID (US)

( * ) Notice: Subject to any disclaimer, the term of this patent is extended or adjusted under 35 U.S.C. 154(b) by 46 days.

(21) Appl. No.: 12/901,309

(22) Filed: Oct. 8, 2010

(65) Prior Publication Data

US 2012/0088088 A1   Apr. 12, 2012

(51) Int. Cl.
| | |
|---|---|
| D02G 3/16 | (2006.01) |
| C04B 35/00 | (2006.01) |
| C04B 35/622 | (2006.01) |
| B82Y 30/00 | (2011.01) |
| C01B 31/36 | (2006.01) |
| C04B 35/565 | (2006.01) |
| C04B 35/571 | (2006.01) |
| C04B 35/573 | (2006.01) |
| C04B 35/80 | (2006.01) |

(52) U.S. Cl.
CPC .......... *C04B 35/62281* (2013.01); *B82Y 30/00* (2013.01); *C01B 31/36* (2013.01); *C04B 35/565* (2013.01); *C04B 35/571* (2013.01); *C04B 35/573* (2013.01); *C04B 35/806* (2013.01); *C04B 2235/428* (2013.01); *C04B 2235/46* (2013.01); *C04B 2235/48* (2013.01); *C04B 2235/5244* (2013.01); *C04B 2235/5248* (2013.01); *C04B 2235/526* (2013.01); *C04B 2235/5264* (2013.01); *C04B 2235/5284* (2013.01); *C04B 2235/5445* (2013.01); *C04B 2235/616* (2013.01); *C04B 2235/72* (2013.01); *C04B 2235/767* (2013.01)

USPC .......... 428/398; 428/367; 428/368; 428/375; 428/389; 428/293.4; 428/294.1; 501/95.1; 501/95.2; 501/95.3

(58) Field of Classification Search
None
See application file for complete search history.

(56) References Cited

U.S. PATENT DOCUMENTS

| | | | | |
|---|---|---|---|---|
| 2,784,112 | A | * | 3/1957 | Nicholson ...................... 427/239 |
| 3,166,614 | A | | 1/1965 | Taylor |
| 3,369,920 | A | | 2/1968 | Bourdeau et al. |
| 3,386,840 | A | * | 6/1968 | Gruber ............................. 501/88 |

(Continued)

FOREIGN PATENT DOCUMENTS

| | | | |
|---|---|---|---|
| EP | 603888 | A2 * | 6/1994 |
| JP | 50038700 | A * | 4/1975 |

(Continued)

OTHER PUBLICATIONS

Ryan et al., "The Conversion of Cubid to Hexagonal Silicon Carbide as a Function of Temperature and Pressure"; USAF, 1967.*

(Continued)

*Primary Examiner* — Jill Gray
(74) *Attorney, Agent, or Firm* — Workman Nydegger

(57) ABSTRACT

Methods of producing silicon carbide fibers. The method comprises reacting a continuous carbon fiber material and a silicon-containing gas in a reaction chamber at a temperature ranging from approximately 1500° C. to approximately 2000° C. A partial pressure of oxygen in the reaction chamber is maintained at less than approximately $1.01 \times 10^2$ Pascal to produce continuous alpha silicon carbide fibers. Continuous alpha silicon carbide fibers and articles formed from the continuous alpha silicon carbide fibers are also disclosed.

21 Claims, 1 Drawing Sheet

(56) References Cited

U.S. PATENT DOCUMENTS

| | | | |
|---|---|---|---|
| 3,427,222 A | | 2/1969 | Biancheria et al. |
| 3,519,472 A | * | 7/1970 | Evans et al. .............. 117/75 |
| 3,808,087 A | * | 4/1974 | Milewski et al. .............. 428/86 |
| 3,813,340 A | * | 5/1974 | Knippenberg et al. ......... 117/87 |
| 3,925,151 A | | 12/1975 | Klepfer |
| 4,013,503 A | * | 3/1977 | Knippenberg et al. ......... 117/75 |
| 4,022,662 A | | 5/1977 | Gordon et al. |
| 4,284,612 A | * | 8/1981 | Horne et al. .................. 423/345 |
| 4,406,012 A | | 9/1983 | Gordon et al. |
| 4,445,942 A | | 5/1984 | Cheng et al. |
| 4,473,410 A | | 9/1984 | Grubb et al. |
| 4,707,330 A | | 11/1987 | Ferrari |
| 4,756,895 A | * | 7/1988 | Boecker et al. .............. 423/345 |
| 4,864,186 A | | 9/1989 | Milewski et al. |
| 4,894,203 A | | 1/1990 | Adamson |
| 4,908,340 A | * | 3/1990 | Frechette et al. ............ 501/95.2 |
| 4,948,763 A | * | 8/1990 | Hayashida et al. ........... 501/95.1 |
| 4,971,673 A | * | 11/1990 | Weisweiler et al. ..... 204/192.15 |
| 5,063,107 A | * | 11/1991 | Birchall et al. ............... 428/367 |
| 5,067,999 A | | 11/1991 | Streckert et al. |
| 5,135,895 A | * | 8/1992 | Frechette et al. ............ 501/95.1 |
| 5,182,077 A | | 1/1993 | Feinroth |
| 5,190,737 A | | 3/1993 | Weimer et al. |
| 5,230,848 A | * | 7/1993 | Wallace et al. ................ 264/82 |
| 5,238,711 A | | 8/1993 | Barron et al. |
| 5,268,946 A | | 12/1993 | Bryan et al. |
| 5,340,417 A | | 8/1994 | Weimer et al. |
| 5,354,527 A | * | 10/1994 | Frechette et al. ............. 264/639 |
| 5,366,943 A | | 11/1994 | Lipowitz et al. |
| 5,383,228 A | | 1/1995 | Armijo et al. |
| 5,434,897 A | | 7/1995 | Davies |
| 5,436,042 A | | 7/1995 | Lau et al. |
| 5,449,421 A | * | 9/1995 | Hamajima et al. ............ 148/415 |
| 5,618,510 A | | 4/1997 | Okada et al. |
| 5,676,918 A | * | 10/1997 | Okada et al. .................. 423/346 |
| 5,814,840 A | * | 9/1998 | Woodall et al. ............... 257/103 |
| 5,922,300 A | * | 7/1999 | Nakajima et al. ............. 423/346 |
| 6,022,515 A | | 2/2000 | Stole et al. |
| 6,110,279 A | | 8/2000 | Kito et al. |
| 6,113,982 A | | 9/2000 | Claar et al. |
| 6,316,051 B2 | * | 11/2001 | Okada ........................... 427/214 |
| 7,041,266 B1 | | 5/2006 | Angier et al. |
| 7,083,771 B2 | | 8/2006 | Angier et al. |
| 7,125,514 B2 | | 10/2006 | Okamura et al. |
| 7,687,016 B1 | | 3/2010 | DiCarlo et al. |
| 2002/0033545 A1 | | 3/2002 | Marlowe |
| 2002/0058107 A1 | | 5/2002 | Fareed et al. |
| 2006/0039524 A1 | | 2/2006 | Feinroth et al. |
| 2006/0227924 A1 | | 10/2006 | Hallstadius et al. |
| 2007/0064861 A1 | | 3/2007 | Sterbentz |
| 2009/0032178 A1 | | 2/2009 | Feinroth |
| 2010/0120604 A1 | | 5/2010 | Easler et al. |
| 2012/0087457 A1 | | 4/2012 | Garnier et al. |

FOREIGN PATENT DOCUMENTS

| | | | |
|---|---|---|---|
| JP | 06192917 A | * | 7/1994 |
| JP | 2010143771 JP | | 1/2010 |
| JP | 2010143771 A | * | 7/2010 |
| WO | 95/15564 A1 | | 6/1995 |

OTHER PUBLICATIONS

Makikawa, JP2010143771, machine translation, 2010.*
CN 2700346 Y, Lan et al., 2005, machine translation.*

"High-Performance Synthetic Fibers for Composites," National Materials Advisory Board, Commission on Engineering and Technical Systems, National Research Council, Publication NMAB-458, Apr. 1992, 142 pages.
Al-Olayyan, Y., et al., The Effect of Zircaloy-4 Substrate Surface Condition on the Adhesion Strength and Corrosion of SiC Coatings, Journal of Nuclear Materials, 2005, pp. 109-119, vol. 346, Elsevier B.V.
"An Innovative Ceramic Corrosion Protection System for Zircaloy Cladding," Year 3—4th Quarter Report (+6), NERI Research Project No. DE-FG03-99SF21882, Feb. 2003.
Bye et al., "Occurrence of airborne silicon carbide fibers during industrial production of silicon carbide," Scand J Work Environ health 11 (1985) 111-115.
Garnier, John, et al., Ex-Reactor Determination of Thermal Gap Conductance Between Uranium Dioxide and Zircaloy-4, Stage II: High Gas Pressure, Prepared for Nuclear Regulatory Commission, NUREG/CR-0330 PNL-3232, vol. 2, Jul. 1980, 78 pages.
"Hexoloy SA Silicon Carbide, Technical Data," Saint-Gobain Advanced Ceramics, 2003, 4 pages.
"Hi-Nicalon Ceramic Fiber," COI Ceramics, Inc., Jan. 2006, 2 pages.
"Hi-Nicalon Type S Ceramic Fiber," COI Ceramics, Inc., Jan. 2006, 2 pages.
"Sylramic SiC Fiber," COI Ceramics, Inc., Jan. 2006, 2 pages.
"UBE Tyranno Fibers," Engineering Ceramics, 2005, 3 pages.
U.S. Appl. No. 12/901,326, filed Oct. 8, 2010, titled "Cladding Material, Tube Including Such Cladding Material and Methods of Forming the Same," to Garnier et al.
Haibo et al., "Synthesis of a silicon carbide coating on carbon fibers by deposition of a layer of pyrolytic carbon and reacting it with silicon monoxide," Carbon 46 (2008) 1339-1344.
Jayaseelan et al., "In Situ Formation of Silicon Carbide Nanofibers on Cordierite Substrates," J. Am. Ceram. Soc., 90 [5] 1603-1606 (2007).
PCT International Search Report and Written Opinion of the International Searching Authority for PCT/US11/55025, dated Feb. 27, 2012, 7 pages.
Milewski, "Growth of Beta-Silicon Carbide Whiskers by the VLS Process," Journal of Materials Science 20, 1985, pp. 1160-1166.
Wikipedia entry, "Activated Carbon," http://en.wikipedia.org/wiki/Activated_carbon, accessed Jun. 18, 2012, 15 pages.
PCT International Search Report and Written Opinion of the International Searching Authority for PCT/US11/55031, dated Feb. 13, 2012, 10 pages.
Mortensen, Andrew, "Concise Encyclopedia of Composite Materials", Technology & Engineering, pp. 866-869, Dec. 8, 2003.
Belitskus, David, "Fiber and Whisker Reinforced Ceramics for Structural Application", Technology & Engineering, pp. 81-83 and 86-90, 1993.
"Silar® SiC Whiskers for Ceramic Systems", www.acm-usa.com/Pages/Materials/details.apx?fsid=0, Accessed Oct. 9, 2013, 1 pg.
Wikipedia entry, "Vapor-liquid-solid method", http://en.wikipedia.org/wiki/Vapor-Liquid-Solid<method, Accessed Oct. 9, 2013, 7 pages.
U.S. Appl. No. 12/901,326, filed Aug. 12, 2013, Restriction Requirement.
Okada et al., "Preparation of Silicon Carbide Fiber from Activated Carbon Fiber and Gaseous Silicon Monoxide", Journal of the American Ceramic Society, 77 [6], pp. 1691-1693, 1994.
Okada et al., "Preparation of Silicon Carbide Fiber from Activated Carbon Fiber and Gaseous Silicon Monoxide", Ceramic Engineering & Science Proceedings, 1995, pp. 45-54.

* cited by examiner

SILICON CARBIDE FIBERS AND ARTICLES INCLUDING SAME

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

CROSS-REFERENCE TO RELATED APPLICATION

This application is related to U.S. patent application Ser. No. 12/901,326, filed Oct. 8, 2010, to Garnier et al., entitled "CLADDING MATERIAL, TUBE INCLUDING SUCH CLADDING MATERIAL AND METHODS OF FORMING THE SAME," assigned to the Assignee of the present application and filed on even date herewith, the disclosure of which is incorporated by reference herein in its entirety.

TECHNICAL FIELD

The invention, in various embodiments, relates generally to methods of producing alpha silicon carbide. More specifically, the invention, in various embodiments, relates to methods of producing alpha silicon carbide in continuous fiber form, alpha silicon carbide fibers, and articles including the continuous alpha silicon carbide fibers.

BACKGROUND

Silicon carbide fiber is used to provide mechanical strength at high temperatures to fibrous products, such as high temperature insulation, belting, gaskets, or curtains, or as reinforcements in plastic, ceramic, or metal matrices of high performance composite materials. To provide mechanical strength to these products or materials, the silicon carbide has relatively fine grain sizes and low density, one third as compared to steel. Silicon carbide is also used in advanced nuclear fuel elements to provide mechanical stability and higher thermal conductivity to the oxide based fuel. The silicon carbide can also function as a diffusion barrier to the release of fission products.

Silicon carbide exists in approximately 250 crystalline forms, including the alpha polymorph or polytype and the beta polymorph, each of which has a different crystal structure. Silicon carbide is commercially available in many forms, such as powders or particulates, fibers, whiskers, or cloth, depending on the polymorph. Alpha silicon carbide has a hexagonal crystal structure and a decomposition temperature of approximately 2730° C. Alpha silicon carbide is conventionally manufactured as a powder on a large scale for use in monolithic (non-fiber) silicon carbide products. Monolithic forms of alpha silicon carbide are known in the art, such as HEXOLOY® SA silicon carbide from Saint-Gobain Advanced Ceramics (Niagara Falls, N.Y.). HEXOLOY® SA silicon carbide exhibits reliable performance in air at temperatures greater than 1900° C. and is used at temperatures of at least 2200° C. in inert environments. Monolithic (non-fiber) forms of alpha silicon carbide contain no alpha silicon carbide fibers or beta silicon carbide fibers. The HEXOLOY® SA silicon carbide is produced by pressureless sintering of silicon carbide powder. One known process of forming monolithic alpha silicon carbide is to heat sub-micron alpha silicon carbide powder formed by the Acheson process to a temperature of 2200° C. and pressureless sinter the alpha silicon carbide powder into a product shape using sintering aids, such as boron or calcium. Another process for forming monolithic alpha silicon carbide is the Lely process, in which silicon carbide powder is sublimated in an argon atmosphere at a temperature of 2500° C. and re-deposited into single crystals. Monolithic alpha silicon carbide may also be formed by reaction bonding silicon and carbon powder, or by chemical vapor deposition (CVD) using gases such as silane ($SiH_4$), propane ($C_3H_8$), or more complex gases to form a coating.

Beta silicon carbide has a cubic or zinc blende crystal structure. The silicon carbide composite industry is based on the use of beta silicon carbide fibers in a beta silicon carbide matrix. The crystalline structure of the matrix is the same as the crystalline structure of the fibers to maintain phase stability at elevated temperatures. Beta silicon carbide fibers are commercially available, such as SYLRAMIC® silicon carbide fibers from COI Ceramics, Inc. (San Diego, Calif.), HI-NICALON™ ceramic fibers and HI-NICALON™ type S ceramic fibers from Nippon Carbon (Tokyo, Japan) and distributed through COI Ceramics, Inc (San Diego, Calif.), and TYRANNO FIBER® from Ube Industries, Ltd. (Tokyo, Japan). Beta silicon carbide fibers are used with the beta silicon carbide matrix in ceramic matrix composites (CMCs). However, CMCs including the beta silicon carbide matrix and beta silicon carbide fibers have limited temperature use due to fiber degradation. These CMCs may be used for short times at a temperature up to 1400° C. or may be used continuously at a temperature below 1200° C. Beta silicon carbide particulate powder is conventionally produced by the Acheson process in which silicon dioxide and carbon are reacted in an electric resistor furnace at a temperature between 1600° C. and 2500° C. The beta silicon carbide may also be formed by the conversion of silicon monoxide and carbon into fibers of beta silicon carbide. The commercially available fibers of beta silicon carbide are produced using a pre-ceramic polymer conversion route enabling extrusion of continuous fibers, followed by high temperature sintering in a controlled atmosphere to about 1600° C. Other processes of producing beta silicon carbide require activation of the carbon using oxygen to enhance silicon dioxide or silicon monoxide reaction with the carbon. Moreover, attempts to make alpha silicon carbide fibers by these processes have not been successful as further heat treatment of the formed beta silicon carbide fibers causes the fibers to lose thermal and mechanical properties at temperatures above 1700° C., and heating to effect crystalline conversion (from beta to alpha) results in significant mechanical property degradation.

It would be desirable to produce fibers of alpha silicon carbide for use in a variety of high temperature and composite applications. It would also be desirable to produce the alpha silicon carbide fibers in an economical manner.

BRIEF SUMMARY

An embodiment of the present disclosure includes a method of producing silicon carbide fibers. The method comprises reacting a continuous carbon fiber material and a silicon-containing gas in a reaction chamber at a temperature ranging from approximately 1500° C. to approximately 2000° C. A partial pressure of oxygen in the reaction chamber is maintained at less than approximately $1.01 \times 10^2$ Pascal to produce continuous alpha silicon carbide fibers.

Another embodiment of the present disclosure includes a method of producing silicon carbide fibers. The method comprises drawing a continuous carbon fiber material into a reaction zone of a reaction chamber, the reaction zone comprising silicon dioxide, silicon, and a carrier gas. The reaction zone comprising the silicon dioxide, silicon, and a carrier gas is heated to a temperature ranging from approximately 1600° C. to approximately 1800° C. while maintaining a partial pressure of oxygen of less than approximately $1.01 \times 10^2$ Pascal in the reaction zone to produce continuous alpha silicon carbide fibers.

Yet another embodiment of the present disclosure includes a silicon carbide fiber comprising a coating of alpha silicon carbide on a carbon fiber material.

Yet still another embodiment of the present disclosure includes a continuous silicon carbide fiber comprising alpha silicon carbide surrounding a hollow core.

Another embodiment of the present disclosure includes an article comprising continuous alpha silicon carbide fibers dispersed in a matrix of alpha silicon carbide.

BRIEF DESCRIPTION OF THE SEVERAL VIEWS OF THE DRAWINGS

While the specification concludes with claims particularly pointing out and distinctly claiming that which is regarded as the present invention, the advantages of embodiments of the disclosure may be more readily ascertained from the following description when read in conjunction with the accompanying drawings in which:

DETAILED DESCRIPTION

Figure 1:
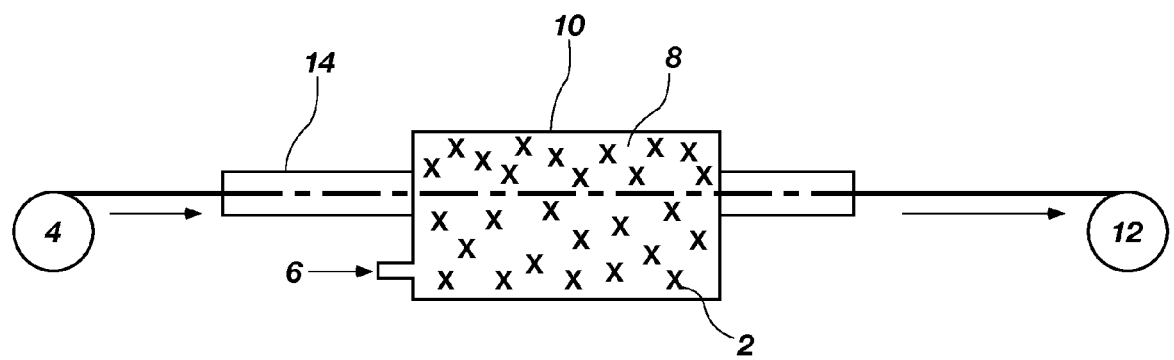
FIG. 1 is a schematic illustration of a reaction chamber utilized in a method to form alpha silicon carbide fibers according to embodiments of the disclosure.

Methods of forming continuous fibers of alpha silicon carbide are disclosed, as are continuous alpha silicon carbide fibers and articles formed from the continuous alpha silicon carbide fibers. As used herein, the term "continuous fibers" or "continuous alpha silicon carbide fibers" means and includes fibers that may be formed or manufactured to an indefinite length and, thus, are not process-constrained to any particular length other than a length of carbon fiber material feedstock employed. The continuous fibers may be of a sufficient length to be woven or braided into an article or product. By way of example, the continuous fibers may have a length ranging from approximately five centimeters to a length of greater than or equal to approximately one meter. The term "continuous fibers" is used in contrast to discontinuous fibers, which have a discrete length, such as a length of less than approximately five centimeters. The continuous alpha silicon carbide fibers may be directly formed from a carbon fiber material. As used herein, the term "directly formed" means and includes formation of the continuous alpha silicon carbide fibers from the carbon fiber material without additional post-processing acts. By adjusting a temperature, reaction time, and atmospheric conditions under which the reaction is conducted, continuous alpha silicon carbide fibers may be formed. The continuous alpha silicon carbide fibers may be used with an alpha silicon carbide matrix to form articles, such as CMCs. The continuous alpha silicon carbide fibers may be formed from individual filaments having a diameter of from approximately 8 µm to approximately 10 µm. The continuous alpha silicon carbide fibers may include a count of from approximately 300 individual filaments to approximately 3000 individual filaments.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

The continuous alpha silicon carbide fibers may be formed by reacting a silicon-containing gas (g) and a solid carbon fiber material (s) in the presence of a carrier gas as shown in Reaction 1:

Silicon-containing gas+carbon fiber material (s)+carrier gas→alpha silicon carbide fibers (s)+carbon monoxide (g)+carrier gas The reaction is a gas-solid phase reaction that results in the production of the alpha silicon carbide fibers by an irreversible surface chemical exchange reaction between the carbon fiber material and the silicon-containing gas. Reaction 1 is thermodynamically and kinetically driven and proceeds as a function of the reaction temperature and reaction time. Since the reaction to form the alpha silicon carbide fibers is a gas-solid phase deposition reaction, the reaction may be conducted without a sintering aid, which reduces impurities in the alpha silicon carbide fibers. Sintering aids are utilized in conventional processes of producing alpha or beta silicon carbide monolithic ceramics to densify the silicon carbide matrix or to densify the beta silicon carbide fibers. In addition to the alpha silicon carbide fibers, carbon monoxide (CO) is produced in Reaction 1. The carbon monoxide may be removed from a reaction chamber or furnace in which the reaction is conducted by the flow of the carrier gas. The presence of carbon monoxide in the reaction chamber may affect the time at temperature kinetics of the reaction to form the alpha silicon carbide fibers. The silicon-containing gas utilized in Reaction 1 may be a high purity gas, such as silicon monoxide (SiO). The carrier gas utilized in Reaction 1 may be an inert gas including, but not limited to, argon, helium, neon, xenon, or combinations thereof. The inert gas may be used to maintain a low partial pressure of oxygen ($PO_2$) in the reaction chamber in which the reaction is conducted. The inert gas may also be used to remove gaseous byproducts of the reaction, such as carbon monoxide. In one embodiment, the carrier gas is argon. The carrier gas may have a low residual oxygen content ($PO_2$), a low nitrogen content ($PN_2$), and a low water content ($PH_2O$), with each species at a relative partial pressure of less than approximately $1.01 \times 10^2$ Pascal (0.001 atm). Each of the oxygen, nitrogen, or water in the carrier gas may be present at a concentration of less than approximately 1000 parts per million (ppm). The carrier gas may also be a mixture of carbon monoxide and carbon dioxide, which includes a low concentration of oxygen, nitrogen, and water vapor, and may be used to produce a low oxygen partial pressure over the temperature ranges of the process (up to $PO_2=1 \times 10^{-21}$ atm). The carrier gas may also be a combination of an inert gas and a mixture of carbon monoxide and carbon dioxide. By utilizing a carrier gas of high purity, the resulting alpha silicon carbide fibers may include low concentrations of oxygen and nitrogen, which if present at high concentrations in the alpha silicon carbide fibers may have a negative effect in lowering both thermal and mechanical properties and may be a source of fiber swelling during irradiation. In contrast, conventional processes of producing silicon carbide fibers that utilize sintering aids result in oxygen and nitrogen impurities in the fibers, which affect the high temperature performance of the fibers.

In one embodiment, the silicon-containing gas is silicon monoxide and the carrier gas is argon, and the alpha silicon carbide fibers are formed according to Reaction 2:

$$SiO\ (g) + 2\ \text{carbon fiber material}\ (s) + Ar\ (g) \rightarrow \text{alpha silicon carbide fibers}\ (s) + CO\ (g) + Ar\ (g).$$

To generate the silicon monoxide, silicon dioxide ($SiO_2$) and silicon (Si) are reacted according to Reaction 3:

$$\text{Silicon dioxide}\ (s) + \text{silicon}\ (s)\ 2SiO\ (g)$$

The silicon dioxide ($SiO_2$) and silicon (Si) may be heated in the reaction chamber in which Reaction 1 or Reaction 2 is to be conducted. The amount of silicon monoxide generated within the reaction chamber may depend on the amount of silicon dioxide and silicon used. Each of the silicon dioxide and the silicon may be a high purity powder commercially available from a chemical supply company, such as from Sigma-Aldrich Co. (St. Louis, Mo.). The silicon dioxide and the silicon may be placed in a container, such as in a boat, in the reaction chamber and the reaction chamber heated to a temperature greater than approximately 600° C. Alternatively, the silicon dioxide and silicon may be continuously added to the container in the reaction chamber, enabling a continuous source of the silicon monoxide and continuous conversion of the carbon fiber material into the alpha silicon carbide fibers. The silicon monoxide may be produced in the same reaction chamber in which Reaction 1 or Reaction 2 is to be conducted. However, the silicon monoxide may also be produced in a separate reaction chamber or furnace and introduced into the reaction chamber containing the carbon fiber material. The vapor pressure of silicon monoxide species produced in the reaction chamber may be maintained at less than or equal to approximately 1 atm at the highest process temperature (approximately 1750° C.) within the reaction chamber. When Reactions 2 and 3 are conducted at a low partial pressure of oxygen and a high temperature, silicon monoxide gas may be produced. While other methods of producing silicon monoxide are known, in one embodiment, the silicon monoxide is produced as described in Reaction 3 because no secondary gases are produced. For instance, when silicon dioxide and hydrogen gas are reacted to produce silicon monoxide, water is formed as a byproduct of the reaction. The presence of excess hydrogen in the reaction chamber may provide a source of impurities in the fibers as described previously in regard to oxygen and nitrogen impurities from sintering aids.

The carbon fiber material used in Reaction 1 or Reaction 2 may be a carbonaceous material that has microscopic crystals axially aligned in long chains, such as a polyaromatic hydrocarbon (pitch resin) or a polyacrylonitrile (PAN) processed carbon. The carbon fiber material may also include carbon nanotubes. The carbon fiber material may be a multi-filament carbon tow and have individual filament diameters of from approximately 1 µm to approximately 100 µm, such as from approximately 2 µm to approximately 20 µm. The diameter of the carbon fiber material may be selected based on the desired diameter of the alpha silicon carbide fibers. The carbon fiber material may be configured as continuous fibers. As used herein, the term "continuous fibers" means and includes fibers that may be formed or manufactured to an indefinite length. The carbon fiber material may be of sufficient length to be fed or drawn through the reaction chamber. The carbon fiber material may be substantially pure in that the material predominantly includes carbon and hydrogen. By way of example, the carbon fiber material may have a purity of greater than approximately 99.5%. To prevent the formation of whiskers, minimal impurities (on the order of less than parts per million (ppm)), such as iron, may be present in the carbon fiber material. The carbon fiber material may be relatively inexpensive, such as having a cost in the range of from approximately $30 per pound to approximately $100 per pound or higher. In addition, large quantities of the carbon fiber material may be commercially available. The carbon fiber material may include a mixture of carbon-carbon single bonds, carbon-carbon double bonds, and carbon-carbon triple bonds. To provide sufficient reactivity, the carbon fiber material may include a greater proportion of carbon-carbon single bonds and carbon-carbon double bonds relative to carbon-carbon triple bonds. By way of example, the carbon fiber material may be a pitch-based resin, such as continuous pitch-based carbon fibers available from KUREHA Corporation (Tokyo, Japan) under the name SY-652 pitch based carbon yarn or from Mitsubishi Chemical U.S.A., Inc. (Tokyo, Japan) under the DIALEAD® tradename, such as DIALEAD® KS352U pitch-based carbon fibers. The carbon fiber material may also be a PAN-based carbon fiber, such as AS4C-GP and AS2C-GP or other carbon fibers available from HEXCEL Corporation (Salt Lake City, USA), T300 or other carbon fibers available from Toray Carbon Fibers America, Inc. (Santa Ana, Calif.), or SGL SIGRAFIL® carbon fibers available from SGL Carbon Fibers Ltd. (Gardena, Calif.). The carbon fiber material may be used in Reaction 1 or Reaction 2 without activation, as is required in conventional processes of producing silicon carbide fibers.

The reaction to form the alpha silicon carbide fibers may be conducted in a reaction zone of the reaction chamber, which is described in more detail below. The silicon-containing gas, the carbon fiber material, and the carrier gas may be introduced into the reaction zone of the reaction chamber. The silicon-containing gas may be flowed into the reaction chamber or, if the silicon-containing gas is generated in situ from solid precursors, the solid precursors may be placed in the reaction chamber. The carbon fiber material may be drawn through the reaction zone of the reaction chamber or furnace, which is described in more detail below in regard to FIG. 1. Reaction 2 may occur as the carbon fiber material is drawn into the reaction chamber containing the SiO(g). The carrier gas may be flowed into the reaction chamber at a sufficient flow rate to achieve the desired gaseous environment within the reaction chamber. The flow rate of the carrier gas at standard temperature and pressure conditions may range from approximately 0.001 m³/min to approximately 0.01 m³/min. The reaction zone of the reaction chamber may be maintained at a temperature sufficient for the silicon-containing gas and the carbon fiber material to react, such as at a temperature between approximately 1400° C. and approximately 2000° C., such as from approximately 1500° C. to approximately 2000° C. To obtain the alpha polymorph of the silicon carbide fibers, the temperature in the reaction chamber may be greater than or equal to approximately 1600° C., such as approximately 1800° C. During the reaction, the reaction chamber may be substantially free of oxygen gas. The partial pressure of oxygen in the reaction zone may be maintained at less than or equal to approximately $1.01 \times 10^2$ Pascal (less than or equal to approximately 0.001 atm), such as by minimizing the oxygen content in the carrier gas. The partial pressure of oxygen may also be controlled using gas mixtures, such as a mixture of carbon monoxide and carbon dioxide instead of or in addition to the carrier gas. By adjusting the ratio of PCO/

$PCO_2$ and the reaction temperature, the residual oxygen partial pressure in the reactant chamber may be as low as approximately $1\times10^{-21}$ atm at 1600° C. Utilizing the mixture of carbon monoxide and carbon dioxide may further lower the partial pressure of oxygen, thus generating more silicon monoxide at a lower temperature. If the partial pressure of oxygen during the reaction to produce the alpha silicon carbide fibers is too high, excess oxygen may react with the carbon fiber material, consuming the carbon fiber material. Since the reaction of oxygen with the carbon fiber material is thermodynamically favored compared to the reaction of silicon monoxide with the carbon fiber material, the amount of free oxygen present in the reaction chamber may be minimized. During the direct conversion reaction, the partial pressure of the silicon-containing gas may be greater than the partial pressure of the oxygen.

The carbon fiber material may be reacted with the silicon-containing gas in the reaction zone. The carrier gas may be used to control the gaseous environment in the reaction zone by enabling continuous removal of excess carbon monoxide, produced by the reaction, from the reaction chamber. By continuously removing the carbon monoxide from the reaction chamber, secondary gaseous reactions between the silicon monoxide and carbon monoxide are not favored, which enables the concentration of the carbon fiber material to be maintained at less than or equal to approximately 50 atomic %, thus favoring the formation of the alpha silicon carbide fibers. As the reaction is a continuous process within the reaction zone of the reaction chamber, both the carbon fiber material and the silicon-containing gas may be continuously replenished depending on the rate of draw (inches per minute) of the carbon fiber material and the length of the reaction zone.

During the reaction, as the diffusion of silicon in silicon carbide is lower than the diffusion of carbon in silicon carbide, carbon may diffuse out of the carbon fiber material while silicon from the silicon-containing gas may diffuse into the carbon fiber material and react with the carbon, forming the alpha silicon carbide fibers. With continuous carbon monoxide removal from the reaction surface, the chemical reaction kinetics may favor diffusion of the silicon inward into the carbon fiber material and diffusion of carbon outward from the carbon fiber material. The diffusion of the silicon and carbon may continue as approximately 50% of the carbon diffuses outward from the interior of the carbon fiber material and is removed as carbon monoxide. Concurrently, the silicon diffusing into the carbon fiber material may react with the carbon-carbon single bonds, the carbon-carbon double bonds, and the carbon-carbon triple bonds to form the alpha silicon carbide fibers. During the reaction, the resulting formation of silicon carbide fiber material may exhibit a volumetric expansion of up to approximately 2%. Due to the high surface area of the carbon fiber material, the reaction may proceed to completion in an amount of time ranging from approximately seconds to approximately minutes, such as less than approximately 10 minutes. However, the reaction time may vary depending on the reaction temperature. The single bonds between carbon-carbon atoms of the carbon fiber material may be readily broken, while the breaking of double bonds and triple bonds may proceed at a slower rate. Without being bound by a particular theory, as the carbon-carbon bonds of the carbon fiber material break, reaction with a silicon atom from the silicon-containing gas occurs, resulting in formation and growth of sub-micron grains of alpha silicon carbide within the filaments of the carbon fiber material. Within individual filaments of the carbon fiber material, the different, yet repeating, carbon-carbon bonds may be distributed in a manner such that at complete conversion, the alpha silicon carbide fibers include sub-micron size silicon carbide grains. The fine silicon carbide grain structure is believed to provide individual filaments of the alpha silicon carbide fibers with mechanical strength. By maintaining approximately the same stoichiometric ratio of silicon and carbon (Si/C=1) during the reaction and elevated temperature conditions favoring formation of the alpha crystalline, the alpha polymorph of silicon carbide may be formed. However, if the processing conditions in the reaction chamber are adjusted to a lower reaction temperature, the beta polymorph of silicon carbide may, undesirably, be produced.

The alpha silicon carbide fibers produced by the method of the present disclosure may exhibit a green color in visible light, in contrast to the black color of beta silicon carbide fibers. Other methods to confirm the presence of the alpha crystalline structure may also be used, such as x-ray spectroscopy and laser Raman spectroscopy. Therefore, formation of the alpha silicon carbide fibers by the method of the present disclosure may be confirmed visually. The alpha silicon carbide fibers produced by the method of the present disclosure may predominantly include the alpha polymorph of silicon carbide, such as including greater than approximately 99% of the alpha polymorph. The alpha silicon carbide fibers may include filaments of alpha silicon carbide, with each filament having a diameter of from approximately 1 µm to approximately 100 µm, such as from approximately 2 µm to approximately 20 µm. The continuous alpha silicon carbide fibers may be formed into a weavable filament fiber tow form.

Depending on the extent to which the reaction proceeds, the carbon fiber material may be fully converted or partially converted into the alpha silicon carbide fibers. By adjusting the conditions within the reaction zone, such as the reaction temperature or reaction time, the alpha silicon carbide fibers that are formed may be on a continuum of partially converted alpha silicon carbide fibers to fully converted alpha silicon carbide fibers. If the reaction conditions are such that the reaction proceeds to substantial completion, fully dense or fully converted alpha silicon carbide fibers may be formed. The fully converted alpha silicon carbide fibers may have a density of approximately 3.21 g/cc, which is approximately the theoretical density of alpha silicon carbide fibers, less than approximately 2% dimensional expansion, and a silicon-carbon bond length greater than the carbon-carbon bond length. As the reaction proceeds, the alpha silicon carbide fibers may exhibit minimal dimensional changes in diameter or length relative to the diameter or length of the carbon fiber material. In contrast, process-induced dimensional changes to the diameter or length of a starting fiber have been observed in the manufacture of beta silicon carbide fibers. Since the alpha silicon carbide fibers exhibit minimal shrinkage and form fine sub-micron silicon carbide grains, the alpha silicon carbide fibers exhibit desirable properties for use as a high performance alpha silicon carbide fiber.

When forming the fully converted alpha silicon carbide fibers, greater than approximately 99.8% of the carbon from the carbon fiber material may be reacted with the silicon from the silicon-containing gas. The reaction may proceed until substantially all of the carbon is converted, unless a partial conversion is desired, and the drawn alpha silicon carbide fibers may be removed from the reactant zone. As the diffusion of silicon in silicon carbide is lower than the diffusion of carbon in silicon carbide, the fully converted alpha silicon carbide fibers may include a narrow, hollow core surrounded by the alpha silicon carbide. By way of example, the hollow core in the fully converted alpha silicon carbide fibers may have a diameter of from approximately 0.01 µm to approximately 0.1 μm for alpha silicon carbide fibers having a diameter of 10 μm. The formation of the hollow core may be due to a lower diffusion rate for silicon inward than for carbon outward. The hollow core may provide a dual wall to the fully converted alpha silicon carbide fibers, which may provide a higher mechanical strength and higher fiber bending radius to the fibers. The hollow core may also reduce filament density, while increasing the overall mechanical strength of the fully converted alpha silicon carbide fibers. Therefore, the fully converted alpha silicon carbide fibers may exhibit properties desirable for use in the nuclear, aerospace, and armor industries.

The fully converted alpha silicon carbide fibers may be formed by slowly pulling or drawing the carbon fiber material through the reaction zone of the reaction chamber, which contains the silicon-containing gas and the carrier gas. By enabling the carbon fiber material and the silicon-containing gas to be in contact for a longer period of time, i.e., by increasing the reaction time, the carbon fiber material may be fully converted into the alpha silicon carbide fibers.

If the conditions within the reaction zone are maintained such that the reaction does not proceed to substantial completion, partially dense or partially converted alpha silicon carbide fibers may be formed. For instance, by drawing the carbon fiber material through the reaction zone more quickly, such that the reaction of the carbon fiber material and the silicon-containing gas does not proceed to completion, the partially converted alpha silicon carbide fibers may be produced. In the partially converted form, an alpha silicon carbide coating or layer may be formed over a core of the carbon fiber material. The carbon fiber material underlying the alpha silicon carbide coating may be substantially unreacted with silicon and remain in its initial carbon form. The partially converted alpha silicon carbide fibers may provide enhanced environmental oxygen protection to the alpha silicon carbide fibers when used at high temperatures because, in the presence of oxygen, the alpha silicon carbide coating may react to form a protective layer of silicate glass, such as silicon dioxide. A thickness of the alpha silicon carbide coating on the core of the carbon fiber material may depend on the reaction time and the reaction temperature. By way of example, the thickness of the alpha silicon carbide coating on a 10 μm diameter fiber may be from approximately 0.001 μm to approximately 1 μm. Given a constant reactant atmosphere, the thickness of the alpha silicon carbide coating may also depend on the draw rate of the carbon fiber through the reaction zone.

The reaction chamber in which the alpha silicon carbide fibers are produced may be a conventional high temperature tube furnace. The reaction chamber may be a continuous horizontal furnace or a continuous vertical furnace. Such furnaces are known in the art and, therefore, are not described in detail herein. By way of example, the reaction chamber may be a high temperature tube furnace that has been modified for continuous throughput processing of the carbon fiber material. The alpha silicon carbide fibers may be produced in the hot section tube of the furnace, which functions as the reaction zone in which the reaction temperature and partial pressure of oxygen are controlled. By way of example, the tube may be formed from aluminum oxide, silicon carbide, or zirconium oxide. The tube entrance and exit ports may be water-cooled to maintain the desired entrance and exit room temperature during the reaction. The tube may also have end cap enclosures at both ends to enable the carrier gas to be injected into the tube and vented from the reaction chamber, and to provide an entrance port and exit port for the carbon fiber material. The atmosphere within the tube may be maintained at a slight positive pressure of from approximately 1 psig to approximately 10 psig to prevent an external atmosphere, such as air, from entering into the tube. As shown in FIG. 1, a silicon-containing gas 2, a carbon fiber material 4, and a carrier gas 6 may be introduced into a reaction zone 8 of a furnace 10. As illustrated in FIG. 1, the silicon-containing gas 2 is generated in situ in the furnace 10, such as by placing silicon dioxide and silicon in the reaction zone 8 of the furnace 10 and heating the silicon dioxide and silicon as previously described. However, the silicon-containing gas 2 may also be flowed into the reaction zone 8 of the furnace 10 from an external source (not shown) of the silicon-containing gas 2. The carrier gas 6 may also be flowed into the reaction zone 8 of the furnace 10. The carbon fiber material 4 may be drawn or pulled through the reaction zone 8 of the furnace 10 at a sufficient rate to enable the carbon fiber material 4 and the silicon-containing gas 2 to react and produce the alpha silicon carbide fibers 12, such as the fully converted alpha silicon carbide fibers or partially converted alpha silicon carbide fibers. To provide sufficient time for the reaction to occur, the length of the reaction zone 8 may range from approximately five inches to approximately twenty inches. As the process is kinetically driven, a longer reaction zone may enable the carbon fiber material to be drawn through the reaction zone at a faster rate. To enable filaments of the carbon fiber material 4 to be separated before entering the furnace 10, increasing their direct surface area exposure to the silicon monoxide, a tow spreader 14 may be positioned before the reaction zone 8 of the furnace 10. To maintain separation of the filaments during drawing of the carbon fiber material 4 through the reaction zone 8, sufficient tensile pull force may be maintained on the carbon fiber material 4.

The method of producing the alpha silicon carbide fibers according to embodiments of the present disclosure is advantageous because the alpha silicon carbide fibers may be produced on a large scale and at a low cost, with minimal capital investment compared to the cost of producing beta silicon carbide fibers. Additionally, by starting with a premade, carbon fiber material, the alpha silicon carbide fibers may be formed without costly post-processing acts, enabling direct formation of the carbon fiber material into the alpha silicon carbide fibers. It is estimated that alpha silicon carbide fibers produced by the method of the present disclosure may have a total processing cost of from approximately $80 per pound to $200 per pound. In contrast, NICALON™ silicon carbide fibers, which are low temperature performance, beta silicon carbide fibers and include high impurities, cost from approximately $600 per pound to approximately $800 per pound. High purity, beta silicon carbide fibers sold under the HI-NICALON™ Type S trade name require additional processing and cost from approximately $4,000 per pound to approximately $6,000 per pound. In addition, the purity of the alpha silicon carbide fibers produced by the method of the present disclosure may be higher than the purity of conventional beta silicon carbide fibers. The method of the present disclosure is also advantageous because the alpha silicon carbide fibers may be produced by a continuous process.

The alpha silicon carbide fibers may be utilized in a variety of articles or end products where high heat transfer, high use temperature, or stability to nuclear radiation is desired. By way of example, the alpha silicon carbide fibers may have utility in the nuclear, aerospace, armor, or heat management industries, such as a fiber reinforcement in a ceramic matrix composite (CMC). The alpha silicon carbide fibers may be used in articles including, but not limited to, heat exchangers, filters, nuclear fuel containment, fusion reactor components, hot gas engines, turbine engines, hypersonic missile leading edges, or rocket components, such as rocket nozzles. By way of example, the alpha silicon carbide fibers may be used in a cladding material, such as that described in U.S. patent application Ser. No. 12/901,326 to Gamier et al., entitled "CLADDING MATERIAL, TUBE INCLUDING SUCH CLADDING MATERIAL AND METHODS OF FORMING THE SAME." The alpha silicon carbide fibers of the present disclosure may also be used as fiber reinforcement in other materials, such as in metals, ceramics, metal-ceramics, glass, glass ceramics, graphite, carbon, or polymers. In addition, other materials utilized to provide internal structural support are foreseeable uses of the alpha silicon carbide fibers of the present disclosure. The fully converted alpha silicon carbide fibers may also exhibit higher mechanical strength retention to higher temperatures than conventional beta polymorph of silicon carbide. The alpha silicon carbide fibers may exhibit increased thermal conductivity (approximately 4.9 W/ (cm-K)), and high temperature mechanical properties, such as to a temperature of greater than or equal to approximately 2100° C. These properties are beyond the capability of conventional beta silicon carbide fibers, which are limited to use at temperatures of 1400° C. or less and have a thermal conductivity of approximately 3.6 W/ (cm-K).

Figure 2:
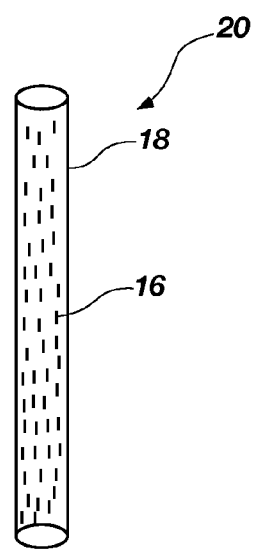
FIG. 2 is a schematic illustration of an article including alpha silicon carbide fibers and an alpha silicon carbide matrix according to embodiments of the disclosure.

As shown in FIG. 2, alpha silicon carbide fibers 16 may be utilized with an alpha silicon carbide matrix 18 to form an article 20, such as a CMC, having desirable properties. For use in high temperature applications, articles 20 including silicon carbide should avoid the temperature-activation, energy-driven phenomenon of Ostwald ripening, which may occur if a CMC contains dissimilar crystalline structures of silicon carbide. For these applications, the silicon carbide matrix 18 used with the alpha silicon carbide fibers 16 may be of the alpha polymorph. The alpha silicon carbide fibers 16 may be dispersed or embedded within the alpha silicon carbide matrix 18. The alpha silicon carbide fibers 16 may be incorporated into the alpha silicon carbide matrix 18 by conventional techniques, which are, therefore, not described in detail herein, and shaped to produce the desired article 20. The silicon carbide material used as the silicon carbide matrix 18 may be formed using conventional CVD techniques. The alpha silicon carbide matrix 18 may also be formed from a pre-ceramic polymer, such as KiON CERASET® polysilazane 20 or CERASET® polyureasilazane, which are commercially available from the Clariant Corporation (Charlotte, N.C.) and are versatile, low viscosity liquid thermosetting resins. The alpha silicon carbide matrix 18 may also be formed from SMP-10 polycarbosilane/siloxane, which is commercially available from Starfire Systems, Inc. (Malta, N.Y.). The pre-ceramic polymer may be converted to beta silicon carbide or, using a higher processing temperature and alpha silicon carbide crystal seeding, may be used to produce the desired alpha silicon carbide crystalline form. The pre-ceramic polymer may be processed at temperature conditions sufficient to effect formation of amorphous or crystalline alpha silicon carbide. To achieve near full density of the alpha silicon carbide matrix, from five polymer infiltration process (PIP) cycles to seven PIP cycles that include polymer infiltration and conversion may be conducted.

The alpha silicon carbide matrix 18 may also be formed using a polymeric carbon resin having sub-micron silicon particles. The polymeric carbon resin may have a particle size of less than or equal to approximately 10 µm. The polymeric carbon resins may be carbon rich, such as having a carbon to silicon ratio (C: Si) of from approximately 51:49 to approximately 60:40, such as approximately 55:45. The carbon rich stoichiometric ratio is desirable since the silicon particles have a thin outer oxide ($SiO_2$) layer, which is removed as carbon monoxide using the excess carbon in the resin. A combination of polymeric carbon resins may be co-reacted at a temperature of from approximately 1750° C. to approximately 2100° C. to form the alpha silicon carbide matrix 18. The polymeric carbon resin may include less than approximately 0.2% by weight of iron to avoid formation of alpha silicon carbide whiskers in the alpha silicon carbide matrix 18. The resulting alpha silicon carbide matrix 18 may be produced at a high yield and may achieve near full matrix density. Therefore, fewer PIP cycles may be needed, such as from 2 PIP cycles to 3 PIP cycles.

By utilizing the alpha silicon carbide fibers 16 in the alpha silicon carbide matrix 18, the performance and safety utility in many CMCs may be significantly extended, especially in CMCs used in nuclear, turbine engine, or heat exchanger applications. By way of example, a CMC including the alpha silicon carbide fibers 16 and the alpha silicon carbide matrix 18 may be used at a high temperature (greater than approximately 1500° C.) for a long period of time (greater than approximately two hundred hours), which exceeds the temperature and time period that conventional beta silicon carbide fibers may be used.

The alpha silicon carbide fibers 16 may be used as a fiber reinforcement for ceramic or metal-ceramic articles used to contain nuclear fuel in a nuclear reactor including, but not limited to, a light water reactor (LWR), a pressurized water reactor (PWR), a liquid metal fast reactor (LMFR), a high temperature gas-cooled reactor (HTGR), or a steam-cooled boiling water reactor (SCBWR). The alpha silicon carbide fibers 16 may be used with the alpha silicon carbide matrix 18 to produce articles 20, such as metal-ceramic tubes or ceramic tubes to contain the nuclear fuel (i.e., fissile material). The articles 20 may be more stable to irradiation than conventional articles used in the nuclear industry. Forming tubes from the alpha silicon carbide fibers 16 and the alpha silicon carbide matrix 18 may enable longer nuclear fuel use times (i.e., a higher fuel burn up), while imparting significant additional thermal and high temperature mechanical properties to the tubes in the event of a so-called "off-normal" event, such as loss of reactor core coolant. An off-normal event may cause mechanical damage to the fuel rod, adjacent rods or thermal-mechanical damage. Other articles 20 used in a nuclear environment that may contain the alpha silicon carbide fibers 16 and the alpha silicon carbide matrix 18 include, but are not limited to, fuel core channels or spreaders, fuel cladding, or other supporting structures inside nuclear reactor core regions. By using the alpha silicon carbide fibers 16 and the alpha silicon carbide matrix 18 to form the article 20 to be used in the nuclear reactor, the fuel rod lifetime may be increased and safety margins may be significantly increased, which may have a major impact in nuclear power plant capital and operating costs. Articles 20 containing the alpha silicon carbide fibers 16 and the alpha silicon carbide matrix 18 may replace all metal fuel rods or metal components in the reactor core. Given the resurgence in interest of nuclear energy worldwide, there is a major need for both safety and economical performance enhancements to power plant or other reactor operations.

When the alpha silicon carbide fibers 16 are used in low temperature applications, such as those conducted at a temperature of less than approximately 500° C., Ostwald ripening may proceed at a significantly slow rate. Thus, in such low temperature applications, the silicon carbide matrix 18 used with the alpha silicon carbide fibers 16 may be of the beta polymorph. The alpha silicon carbide fibers 16 may be dispersed or embedded within the silicon carbide matrix 18 having a beta crystalline structure.

While the disclosure may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as defined by the following appended claims and their legal equivalents.

What is claimed is:

1. A silicon carbide fiber comprising filaments comprising alpha silicon carbide surrounding a hollow core.

2. The silicon carbide fiber of claim 1, wherein the alpha silicon carbide is substantially free of beta silicon carbide.

3. The silicon carbide fiber of claim 1, wherein the filaments have a diameter of from approximately 1 μm to approximately 100 μm.

4. The silicon carbide fiber of claim 1, wherein the filaments have a diameter of from approximately 2 μm to approximately 20 μm.

5. The silicon carbide fiber of claim 1, wherein the filaments have a diameter of from approximately 8 μm to approximately 10 μm.

6. The silicon carbide fiber of claim 1, wherein the silicon carbide fiber comprises between approximately 300 filaments and approximately 3000 filaments.

7. The silicon carbide fiber of claim 1, wherein the silicon carbide fiber has a length of at least approximately 5 cm.

8. An article comprising a plurality of silicone carbide fibers as recited in claim 1, the silicon carbide fibers being dispersed in a matrix.

9. The article of claim 8, wherein the matrix comprises silicon carbide.

10. The article of claim 8, wherein the matrix comprises alpha silicon carbide.

11. The article of claim 8, wherein the article is configured as at least a portion of a heat exchanger filter nuclear fuel containment fusion reactor component hot gas engine, turbine engine, hypersonic missile leading edge, or rocket component.

12. The silicon carbide fiber of claim 1, wherein greater than approximately 99.8% of carbon atoms in the alpha silicon carbide are bonded to a silicon atom.

13. The silicon carbide fiber of claim 1, wherein the silicon carbide fiber has a density of approximately 3.21 g/cc.

14. A partially converted fiver comprising a layer of alpha silicon carbide formed over a core of unreacted carbon fiber, the layer of alpha silicon carbide including filaments of alpha silicone carbide.

15. The partially converted fiber of claim 14, wherein the layer formed over the core of unreacted carbon fiber is substantially free of beta silicon carbide.

16. The partially converted fiber of claim 14, wherein the core of unreacted carbon fiber is continuous pitch-based resin or a continuous polyacrylonitrile-based carbon fiber.

17. The partially converted fiber of claim 14, wherein the layer formed over the core of unreacted carbon fiber consists essentially of alpha silicon carbide.

18. An article comprising a plurality of partially converted fibers as recited in claim 14, the partially converted fibers being dispersed in a matrix.

19. The article of claim 18, wherein the matrix comprises silicone carbide.

20. The article of claim 18, wherein the matrix comprises alpha silicon carbide.

21. The article of claim 18, wherein the article is configured as at least a portion of a heat exchanger, filter, nuclear fuel containment, fusion reactor component, hot gas engine, turbine engine, hypersonic missile leading edge, or rocket component.

* * * * *

UNITED STATES PATENT AND TRADEMARK OFFICE
CERTIFICATE OF CORRECTION

PATENT NO. : 8,940,391 B2
APPLICATION NO. : 12/901309
DATED : January 27, 2015
INVENTOR(S) : Garnier et al.

Page 1 of 1

It is certified that error appears in the above-identified patent and that said Letters Patent is hereby corrected as shown below:

Tile Page
2nd Column, Other Publications, change "The Conversion of Cubid" to --The Conversion of Cubic--

In the Specification
Column 11
Line 4, change "326to Gamier" to --326 to Garnier--

In the Claims
Column 13
Line 30, Claim 8, change "silicone" to --silicon--

Column 14
Lines 2-3, Claim 11, change "heat exchanger filter nuclear fuel containment fusion reactor component hot gas engine, turbine" to --heat exchanger, filter, nuclear fuel containment, fusion reactor component, hot gas engine, turbine--
Line 10, Claim 14, change "fiver" to --fiber--
Line 13, Claim 14, change "silicone" to --silicon--
Line 27, Claim 19, change "silicone" to --silicon--

Signed and Sealed this
Twenty-second Day of September, 2015

Michelle K. Lee
*Director of the United States Patent and Trademark Office*